US012647986B2

(12) United States Patent
Deghel et al.

(10) Patent No.: US 12,647,986 B2
(45) Date of Patent: Jun. 2, 2026

(54) MULTIPLEXING AND TRANSMITTING CANCELLED UPLINK CONTROL INFORMATION

(71) Applicant: Nokia Technologies Oy, Espoo (FI)

(72) Inventors: Matha Deghel, Montrouge (FR); Klaus Hugl, Vienna (AT)

(73) Assignee: Nokia Technologies Oy, Espoo (FI)

( * ) Notice: Subject to any disclaimer, the term of this patent is extended or adjusted under 35 U.S.C. 154(b) by 453 days.

(21) Appl. No.: 18/247,885

(22) PCT Filed: Oct. 8, 2021

(86) PCT No.: PCT/EP2021/077840
§ 371 (c)(1),
(2) Date: Apr. 5, 2023

(87) PCT Pub. No.: WO2022/078895
PCT Pub. Date: Apr. 21, 2022

(65) Prior Publication Data
US 2023/0379920 A1 Nov. 23, 2023

(30) Foreign Application Priority Data
Oct. 15, 2020 (EP) .................................... 20202107

(51) Int. Cl.
*H04W 72/21* (2023.01)
*H04W 72/56* (2023.01)
(52) U.S. Cl.
CPC .......... *H04W 72/21* (2023.01); *H04W 72/56* (2023.01)

(58) Field of Classification Search
None
See application file for complete search history.

(56) References Cited

U.S. PATENT DOCUMENTS

| 2020/0112397 | A1 | 4/2020 | Park et al. |
| 2020/0154416 | A1 | 5/2020 | He et al. |
| 2020/0314900 | A1* | 10/2020 | Hosseini ............... H04L 1/1854 |

FOREIGN PATENT DOCUMENTS

| CN | 106716898 | A | 5/2017 |
| CN | 108702776 | A | 10/2018 |
| CN | 110603881 | A | 12/2019 |
| CN | 111314033 | A | 6/2020 |
| WO | 2019/030237 | A1 | 2/2019 |
| WO | 2020/041269 | A1 | 2/2020 |

OTHER PUBLICATIONS

"Revised WID: Enhanced Industrial Internet of Things (IoT) and ultra-reliable and low latency communication (URLLC) support for NR", 3GPP TSG RAN Meeting #88e, RP-201310, Agenda: 9.10.5, Nokia, Jun. 29-Jul. 3, 2020, 6 pages.
(Continued)

*Primary Examiner* — Kouroush Mohebbi
(74) *Attorney, Agent, or Firm* — Lippes Mathias LLP

(57) ABSTRACT

Disclosed is a method comprising cancelling a first physical uplink shared channel comprising a first set of uplink control information. The first set of uplink control information is stored. At least a part of the first set of uplink control information is multiplexed on a second physical uplink shared channel. The second physical uplink shared channel is transmitted to a base station.

20 Claims, 10 Drawing Sheets

(56)         References Cited

OTHER PUBLICATIONS

"Discussion on HARQ-ACK enhancements for eURLLC", 3GPP TSG RAN WG1 Meeting #102-e, R1-2005431, Agenda: 8.3.1.1, ZTE, Aug. 17-28, 2020, pp. 1-6.

"Intra-UE Multiplexing/Prioritization Enhancements for IIoT/URLLC", 3GPP TSG RAN WG1 Meeting #102-e, R1-2005516, Agenda: 8.3.3, Ericsson, Aug. 17-28, 2020, 7 pages.

"Methods for Intra-UE Multiplexing and Prioritization", 3GPP TSG RAN WG1 Meeting #102-e, R1-2005636, Agenda: 8.3.3, MediaTek Inc, Aug. 17-28, 2020, 7 pages.

"Feature lead summary #4 on HARQ-ACK feedback enhancements for NR Rel-17 URLLC/IIoT (AI 8.3.1.1)", 3GPP TSG-RAN WG1 Meeting #102-e, R1-2007354, Agenda: 8.3.1.1, Nokia, Aug. 17-28, 2020, pp. 1-141.

"UCI transmission for Simultaneous PUCCH/PUSCH configuration", 3GPP TSG RAN WG1 Meeting #63bis, R1-110395, Agenda: 6.2.1, LG Electronics, Jan. 17-21, 2011, 4 pages.

Extended European Search Report received for corresponding European Patent Application No. 20202107.7, dated Mar. 26, 2021, 14 pages.

"Handling collisions of sTTI and TTI in UL", 3GPP TSG-RAN WG1 Meeting #89, R1-1708841, Agenda: 6.2.1.2.1.4, Ericsson, May 15-19, 2017, 6 pages.

"UCI on sPUSCH with short TTI", 3GPP TSG-RAN WG1 Meeting #89, R1-1708844, Agenda: 6.2.1.2.3.3, Ericsson, May 15-19, 2017, pp. 1-8.

"Discussion on HARQ-ACK enhancement for IIoT/URLLC", 3GPP TSG RAN WG1 #102-e, R1-2006887, Agenda: 8.3.1.1, WILUS Inc, Aug. 17-28, 2020, 4 pages.

International Search Report and Written Opinion received for corresponding Patent Cooperation Treaty Application No. PCT/EP2021/077840, dated Jan. 5, 2022, 17 pages.

Office Action received for corresponding Indian Patent Application No. 202347032453, dated Mar. 21, 2024, 6 pages.

Office Action received for corresponding European Patent Application No. 20202107.7, dated Jun. 4, 2024, 8 pages.

Office action received for corresponding Chinese Patent Application No. 202180070794.7, dated May 22, 2025, 12 pages of office action and no page of translation available.

* cited by examiner

| 701 | Cancel first PUSCH comprising UCI |
| 702 | Store the UCI |
| 703 | Multiplex at least a part of the UCI on a second PUSCH |
| 704 | Transmit the second PUSCH |
| 705 | Delete UCI |

| 801 | Receive configuration |
| 802 | Apply configuration |
| 803 | Cancel first PUSCH comprising UCI |
| 804 | Store the UCI |
| 805 | Receive indication to transmit UCI |
| 806 | Multiplex at least a part of the UCI on a second PUSCH |
| 807 | Transmit the second PUSCH |
| 808 | Delete UCI |

1300

MULTIPLEXING AND TRANSMITTING CANCELLED UPLINK CONTROL INFORMATION

RELATED APPLICATION

This application was originally filed as PCT Application No. PCT/EP2021/077840 on Oct. 8, 2021, which claims priority from European Patent Application No. EP20202107.7, filed on Oct. 15, 2020, each of which is incorporated herein by reference in its entirety.

FIELD

The following exemplary embodiments relate to wireless communication.

BACKGROUND

As resources are limited, it is desirable to optimize the usage of network resources. A terminal device may be utilized to enable better usage of network resources and enhanced user experience to a user of the terminal device.

SUMMARY

The scope of protection sought for various exemplary embodiments is set out by the independent claims. The exemplary embodiments and features, if any, described in this specification that do not fall under the scope of the independent claims are to be interpreted as examples useful for understanding various exemplary embodiments.

According to an aspect, there is provided an apparatus comprising at least one processor, and at least one memory including computer program code, wherein the at least one memory and the computer program code are configured, with the at least one processor, to cause the apparatus to: cancel a first physical uplink shared channel comprising a first set of uplink control information; store the first set of uplink control information; multiplex at least a part of the first set of uplink control information on a second physical uplink shared channel; and transmit, to a base station, the second physical uplink shared channel.

According to another aspect, there is provided an apparatus comprising means for: cancelling a first physical uplink shared channel comprising a first set of uplink control information; storing the first set of uplink control information; multiplexing at least a part of the first set of uplink control information on a second physical uplink shared channel; and transmitting, to a base station, the second physical uplink shared channel.

According to another aspect, there is provided a method comprising cancelling a first physical uplink shared channel comprising a first set of uplink control information; storing the first set of uplink control information; multiplexing at least a part of the first set of uplink control information on a second physical uplink shared channel; and transmitting, to a base station, the second physical uplink shared channel.

According to another aspect, there is provided a computer program comprising instructions for causing an apparatus to perform at least the following: cancel a first physical uplink shared channel comprising a first set of uplink control information; store the first set of uplink control information; multiplex at least a part of the first set of uplink control information on a second physical uplink shared channel; and transmit, to a base station, the second physical uplink shared channel.

According to another aspect, there is provided a computer readable medium comprising program instructions for causing an apparatus to perform at least the following: cancel a first physical uplink shared channel comprising a first set of uplink control information; store the first set of uplink control information; multiplex at least a part of the first set of uplink control information on a second physical uplink shared channel; and transmit, to a base station, the second physical uplink shared channel.

According to another aspect, there is provided a non-transitory computer readable medium comprising program instructions for causing an apparatus to perform at least the following: cancel a first physical uplink shared channel comprising a first set of uplink control information; store the first set of uplink control information; multiplex at least a part of the first set of uplink control information on a second physical uplink shared channel; and transmit, to a base station, the second physical uplink shared channel.

According to an aspect, there is provided an apparatus comprising at least one processor, and at least one memory including computer program code, wherein the at least one memory and the computer program code are configured, with the at least one processor, to cause the apparatus to: transmit, to a terminal device, an indication to transmit a first set of uplink control information on a second physical uplink shared channel, wherein the first set of uplink control information is associated with a cancelled first physical uplink shared channel; and receive, from the terminal device, the second physical uplink shared channel comprising at least a part of the first set of uplink control information.

According to another aspect, there is provided an apparatus comprising means for: transmitting, to a terminal device, an indication to transmit a first set of uplink control information on a second physical uplink shared channel, wherein the first set of uplink control information is associated with a cancelled first physical uplink shared channel; and receiving, from the terminal device, the second physical uplink shared channel comprising at least a part of the first set of uplink control information.

According to another aspect, there is provided a method comprising transmitting, to a terminal device, an indication to transmit a first set of uplink control information on a second physical uplink shared channel, wherein the first set of uplink control information is associated with a cancelled first physical uplink shared channel; and receiving, from the terminal device, the second physical uplink shared channel comprising at least a part of the first set of uplink control information.

According to another aspect, there is provided a computer program comprising instructions for causing an apparatus to perform at least the following: transmit, to a terminal device, an indication to transmit a first set of uplink control information on a second physical uplink shared channel, wherein the first set of uplink control information is associated with a cancelled first physical uplink shared channel; and receive, from the terminal device, the second physical uplink shared channel comprising at least a part of the first set of uplink control information.

According to another aspect, there is provided a computer readable medium comprising program instructions for causing an apparatus to perform at least the following: transmit, to a terminal device, an indication to transmit a first set of uplink control information on a second physical uplink shared channel, wherein the first set of uplink control information is associated with a cancelled first physical uplink shared channel; and receive, from the terminal device, the second physical uplink shared channel comprising at least a part of the first set of uplink control information.

According to another aspect, there is provided a non-transitory computer readable medium comprising program instructions for causing an apparatus to perform at least the following: transmit, to a terminal device, an indication to transmit a first set of uplink control information on a second physical uplink shared channel, wherein the first set of uplink control information is associated with a cancelled first physical uplink shared channel; and receive, from the terminal device, the second physical uplink shared channel comprising at least a part of the first set of uplink control information.

According to another aspect, there is provided a system comprising at least a terminal device and a base station. The terminal device is configured to: cancel a first physical uplink shared channel comprising a first set of uplink control information; store the first set of uplink control information; receive, from the base station, an indication to transmit the first set of uplink control information on a second physical uplink shared channel; multiplex at least a part of the first set of uplink control information on the second physical uplink shared channel; and transmit, to the base station, the second physical uplink shared channel comprising the at least part of the first set of uplink control information. The base station is configured to: transmit, to the terminal device, the indication to transmit the first set of uplink control information on the second physical uplink shared channel; and receive, from the terminal device, the second physical uplink shared channel comprising the at least part of the first set of uplink control information.

According to another aspect, there is provided a system comprising at least a terminal device and a base station. The terminal device comprises means for: cancelling a first physical uplink shared channel comprising a first set of uplink control information; storing the first set of uplink control information; receiving, from the base station, an indication to transmit the first set of uplink control information on a second physical uplink shared channel; multiplexing at least a part of the first set of uplink control information on the second physical uplink shared channel; and transmitting, to the base station, the second physical uplink shared channel comprising the at least part of the first set of uplink control information. The base station comprises means for: transmitting, to the terminal device, the indication to transmit the first set of uplink control information on the second physical uplink shared channel; and receiving, from the terminal device, the second physical uplink shared channel comprising the at least part of the first set of uplink control information.

BRIEF DESCRIPTION OF THE DRAWINGS

In the following, various exemplary embodiments will be described in greater detail with reference to the accompanying drawings, in which.

DETAILED DESCRIPTION

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

In the following, different exemplary embodiments will be described using, as an example of an access architecture to which the exemplary embodiments may be applied, a radio access architecture based on long term evolution advanced (LTE Advanced, LTE-A) or new radio (NR, 5G), without restricting the exemplary embodiments to such an architecture, however. It is obvious for a person skilled in the art that the exemplary embodiments may also be applied to other kinds of communications networks having suitable means by adjusting parameters and procedures appropriately. Some examples of other options for suitable systems may be the universal mobile telecommunications system (UMTS) radio access network (UTRAN or E-UTRAN), long term evolution (LTE, the substantially same as E-UTRA), wireless local area network (WLAN or Wi-Fi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
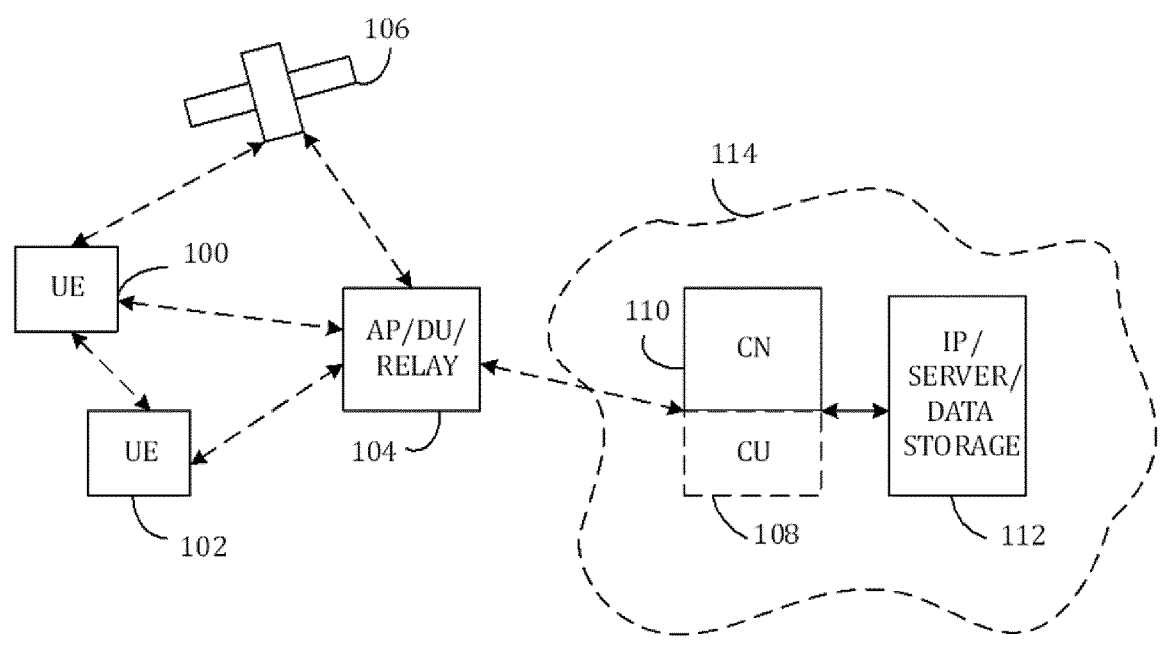
FIG. 1 illustrates an exemplary embodiment of a cellular communication network.

FIG. 1 depicts examples of simplified system architectures showing some elements and functional entities, all being logical units, whose implementation may differ from what is shown. The connections shown in FIG. 1 are logical connections; the actual physical connections may be different. It is apparent to a person skilled in the art that the system may also comprise other functions and structures than those shown in FIG. 1.

The exemplary embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 configured to be in a wireless connection on one or more communication channels in a cell with an access node (such as (e/g)NodeB) 104 providing the cell. The physical link from a user device to a (e/g)NodeB may be called uplink or reverse link and the physical link from the (e/g)NodeB to the user device may be called downlink or forward link. It should be appreciated that (e/g)NodeBs or their functionalities may be implemented by using any node, host, server or access point etc. entity suitable for such a usage.

A communication system may comprise more than one (e/g)NodeB, in which case the (e/g)NodeBs may also be configured to communicate with one another over links, wired or wireless, designed for the purpose. These links may be used for signaling purposes. The (e/g)NodeB may be a computing device configured to control the radio resources of communication system it is coupled to. The NodeB may also be referred to as a base station, an access point or any other type of interfacing device including a relay station capable of operating in a wireless environment. The (e/g) NodeB may include or be coupled to transceivers. From the transceivers of the (e/g)NodeB, a connection may be provided to an antenna unit that establishes bi-directional radio links to user devices. The antenna unit may comprise a plurality of antennas or antenna elements. The (e/g)NodeB may further be connected to core network 110 (CN or next generation core NGC). Depending on the system, the counterpart on the CN side may be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface may be allocated and assigned, and thus any feature described herein with a user device may be implemented with a corresponding apparatus, such as a relay node. An example of such a relay node may be a layer 3 relay (self-backhauling relay) towards the base station.

The user device may refer to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example may be a camera or video camera loading images or video clips to a network. A user device may also be a device having capability to operate in Internet of Things (IoT) network which is a scenario in which objects may be provided with the ability to transfer data over a network without requiring human-to-human or human-to-computer interaction. The user device may also utilize cloud. In some applications, a user device may comprise a small portable device with radio parts (such as a watch, earphones or eyeglasses) and the computation may be carried out in the cloud. The user device (or in some exemplary embodiments a layer 3 relay node) may be configured to perform one or more of user equipment functionalities. The user device may also be called a subscriber unit, mobile station, remote terminal, access terminal, user terminal, terminal device, or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question may have inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G may enable using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications may support a wide range of use cases and related applications including video streaming, augmented reality, different ways of data sharing and various forms of machine type applications (such as (massive) machine-type communications (mMTC), including vehicular safety, different sensors and real-time control. 5G may be expected to have multiple radio interfaces, namely below 6 GHz, cmWave and mmWave, and also being integratable with existing legacy radio access technologies, such as the LTE. Integration with the LTE may be implemented, at least in the early phase, as a system, where macro coverage may be provided by the LTE, and 5G radio interface access may come from small cells by aggregation to the LTE. In other words, 5G may support both inter-RAT operability (such as LTE-5G) and inter-RI operability (inter-radio interface operability, such as below 6 GHz-cmWave, below 6 GHz-cmWave-mmWave). One of the concepts considered to be used in 5G networks may be network slicing in which multiple independent and dedicated virtual sub-networks (network instances) may be created within the substantially same infrastructure to run services that have different requirements on latency, reliability, throughput and mobility.

The current architecture in LTE networks may be fully distributed in the radio and fully centralized in the core network. The low latency applications and services in 5G may need to bring the content close to the radio which leads to local break out and multi-access edge computing (MEC). 5G may enable analytics and knowledge generation to occur at the source of the data. This approach may need leveraging resources that may not be continuously connected to a network such as laptops, smartphones, tablets and sensors. MEC may provide a distributed computing environment for application and service hosting. It may also have the ability to store and process content in close proximity to cellular subscribers for faster response time. Edge computing may cover a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system may also be able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head or base station comprising radio parts. It may also be possible that node operations will be distributed among a plurality of servers, nodes or hosts. Application of cloudRAN architecture may enable RAN real time functions being carried out at the RAN side (in a distributed unit, DU 104) and non-real time functions being carried out in a centralized manner (in a central unit, CU 108).

It should also be understood that the distribution of labour between core network operations and base station operations may differ from that of the LTE or even be non-existent. Some other technology advancements that may be used may be Big Data and all-IP, which may change the way networks are being constructed and managed. 5G (or new radio, NR) networks may be designed to support multiple hierarchies, where MEC servers may be placed between the core and the base station or nodeB (gNB). It should be appreciated that MEC may be applied in 4G networks as well.

5G may also utilize satellite communication to enhance or complement the coverage of 5G service, for example by providing backhauling. Possible use cases may be providing service continuity for machine-to-machine (M2M) or Internet of Things (I) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). At least one satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may also comprise other apparatuses, such as physical layer relay nodes or other network elements, etc. At least one of the (e/g)NodeBs or may be a Home(e/g)nodeB. Additionally, in a geographical area of a radio communication system, a plurality of different kinds of radio cells as well as a plurality of radio cells may be provided. Radio cells may be macro cells (or umbrella cells) which may be large cells having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. In multilayer networks, one access node may provide one kind of a cell or cells, and thus a plurality of (e/g)NodeBs may be needed to provide such a network structure.

For fulfilling the need for improving the deployment and performance of communication systems, the concept of "plug-and-play" (e/g)NodeBs may be introduced. A network which may be able to use "plug-and-play" (e/g)Node Bs, may include, in addition to Home (e/g)NodeBs (H(e/g) nodeBs), a home node B gateway, or HNB-GW (not shown in FIG. 1). A HNB Gateway (HNB-GW), which may be installed within an operator's network, may aggregate traffic from a large number of HNBs back to a core network.

Uplink inter-UE prioritization and/or multiplexing may be used to provide better support for industrial internet of things, IIoT, and/or ultra-reliable low-latency communication, URLLC, use cases. For uplink inter-UE prioritization and/or multiplexing, the network may transmit an uplink cancellation indication, UL CI, via physical downlink control channel, PDCCH, instructing the UEs to cancel ongoing transmissions, such as enhanced mobile broadband, eMBB, transmissions. Thus, resources may be released for higher priority transmissions of another UE, such as URLLC transmissions.

Intra-UE prioritization and/or multiplexing may also be used for IIoT and/or URLLC use cases in order to address control-data, control-control, and data-data prioritization and/or multiplexing for a single UE. For an efficient support of intra-UE prioritization and/or multiplexing, two levels of priority at the physical, PHY, layer were introduced in Rel-16 NR for uplink data channels as well as uplink control channels. The two priority levels may be, for example, priority level 1 to indicate a high priority, and priority level 0 to indicate a low priority. Prioritization is currently supported between channels of different priorities. However, multiplexing between channels associated with different priorities is currently not yet supported. For intra-UE collision handling at the PHY layer, in case a high-priority uplink transmission overlaps with a low-priority uplink transmission, the low-priority uplink transmission may be dropped under certain constraints.

Furthermore, to resolve collisions between uplink transmissions, when there are more than two overlapping uplink channels, the UE may perform the following: 1) resolve collision between uplink transmission with the substantially same priority, and 2) resolve collision between uplink transmissions with different priorities.

Physical uplink shared channel, PUSCH, transmissions may be dynamically scheduled by a dynamic grant, DG, in a downlink control information, DCI, message, or the transmission may correspond to a configured grant, CG, type 1 or type 2. There is currently no support for PHY prioritization of overlapping DG PUSCH and CG PUSCH on the substantially same serving cell with different priorities at the PHY layer, i.e. the medium access control, MAC, should deliver a single MAC protocol data unit, PDU, for either the DG PUSCH or the CG PUSCH. In other words, there is currently no support for a high-priority DG PUSCH cancelling the transmission of a low-priority CG PUSCH in the PHY layer, and for a high-priority CG PUSCH cancelling the transmission of a low-priority DG PUSCH in the PHY layer. Although not supported in Rel-16 NR, this feature may potentially be specified in the future in Rel-17 NR. On the other hand, overlapping CG PUSCH and CG PUSCH with different priorities is supported at the PHY layer. Multiplexing between channels with different priorities may prevent performance degradation at least in terms of spectral efficiency.

If a PUSCH or physical uplink control channel, PUCCH, transmission including hybrid automatic repeat request acknowledgement, HARQ-ACK, feedback gets deprioritized or dropped, and thus the HARQ-ACK feedback information is lost, this may result in performance degradation at least in terms of spectral efficiency. When the HARQ-ACK, or more generally the uplink control information, UCI, is to be multiplexed on a PUSCH, then the PUSCH including the HARQ-ACK may be cancelled due to at least one of the following reasons: 1) overlap or collision with a high priority PUSCH or PUCCH, 2) overlap with downlink symbols, and/or 3) inter-UE prioritization operation using uplink cancellation indication.

An example, wherein the HARQ-ACK feedback may be lost, is presented in the following. In this example, a low-priority PUCCH carrying a HARQ-ACK overlaps with a low-priority DG PUSCH that, in turn, overlaps with a high-priority uplink channel/transmission, which may be a (CG/DG) PUSCH or a PUCCH. The UE may handle the channels with the substantially same priority first, which may result in multiplexing, i.e. piggybacking, the low-priority HARQ-ACK on the low-priority DG PUSCH. However, the low-priority DG PUSCH including the HARQ-ACK may be dropped, since it overlaps with the high-priority uplink channel/transmission, which is prioritized over the low-priority DG PUSCH. The network may issue a retransmission grant in order to retransmit the data of the dropped DG PUSCH. However, currently there may be no procedure for retransmitting the dropped HARQ-ACK feedback information, or more generally the UCI. Hence, the low-priority HARQ-ACK multiplexed on the low-priority PUSCH may be lost, which may result in increased downlink control overhead and reduced downlink efficiency due to unnecessary physical downlink shared channel, PDSCH, retransmissions, i.e. retransmissions of the PDSCH(s) associated with the dropped HARQ-ACK feedback information as the gNB does not know if the associated PDSCH(s) have been correctly received or not.

In the above example and other similar scenarios, there may be a retransmission of data of the low-priority DG PUSCH, as the network may issue a retransmission grant in case of DG PUSCH and in some cases of CG PUSCH. Alternatively, the UE may rely on autonomous retransmission in some other cases of CG PUSCH. However, the dropped HARQ-ACK may anyhow be lost in such scenarios, which may result in performance degradation.

Some exemplary embodiments may provide a solution to avoid losing the dropped UCI, such as the HARQ-ACK feedback, for example in scenarios where the UCI is dropped due to deprioritizing, dropping or cancelling the PUSCH including this UCI, i.e. the PUSCH on which the UCI is multiplexed or piggybacked.

Figure 2:
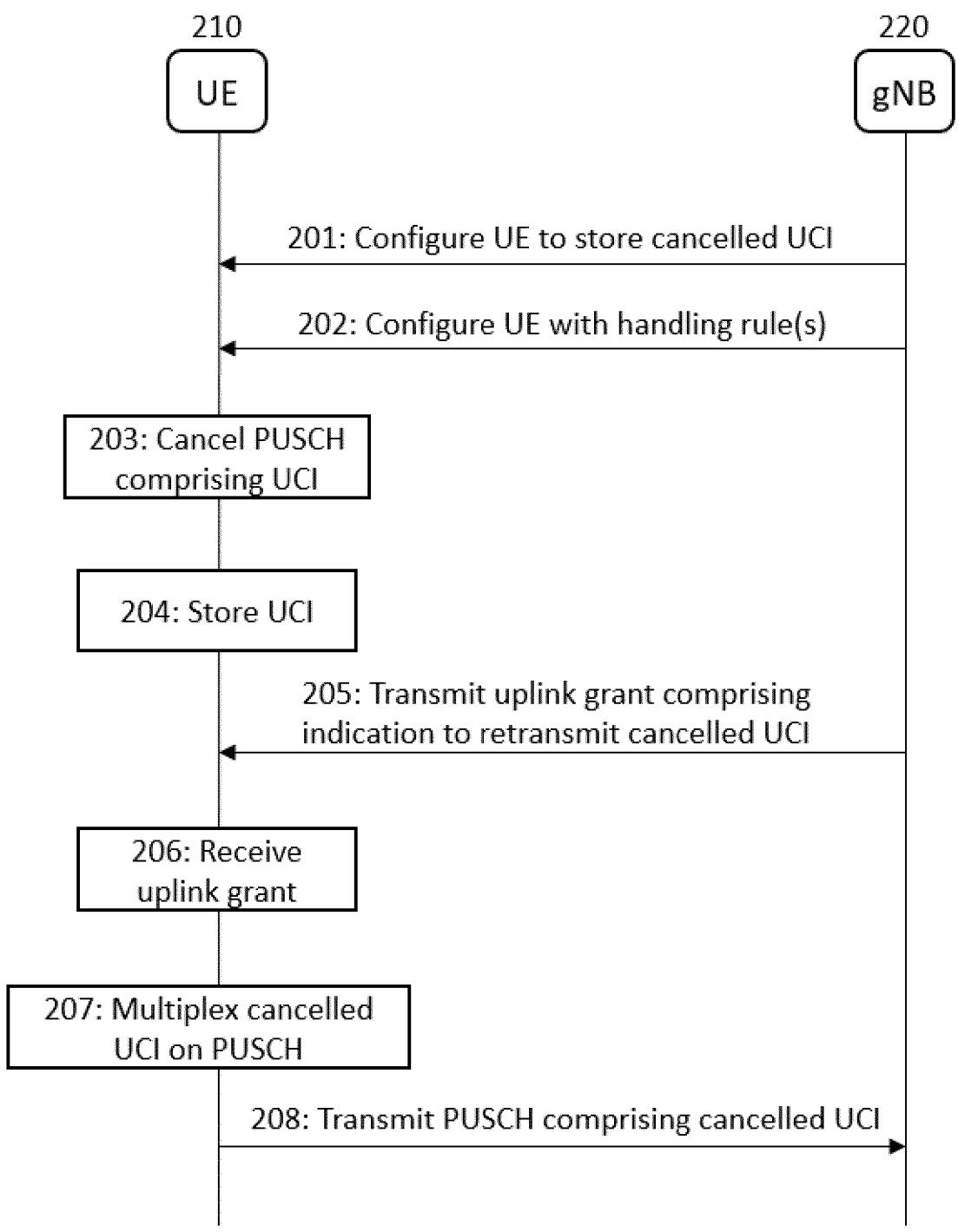
FIG. 2 illustrates a signalling diagram according to an exemplary embodiment.

FIG. 2 illustrates a signalling diagram according to an exemplary embodiment. In this exemplary embodiment, the dropped UCI is retransmitted and multiplexed on an uplink grant that is used either for retransmitting the data of the dropped PUSCH or to transmit new data. A PUSCH comprising multiplexed HARQ-ACK information may be dropped for example due to: 1) an overlap with a higher priority channel, 2) an overlap with downlink or flexible symbols, or 3) inter-UE prioritization operation using uplink cancellation indication.

Referring to FIG. 2, a base station 220, for example a gNB, configures 201 a UE 210 to store, or buffer, the UCI in case it is dropped due to cancelling the PUSCH comprising this UCI. The base station may also configure 202 the UE with one or more multiplexing and/or prioritization rules for cases, wherein the PUSCH, on which the dropped UCI is supposed to be multiplexed, comprises one or more other UCIs to be multiplexed. The configuring 201, 202 may be performed for example via MAC CE, DCI, or radio resource control, RRC.

The UE cancels 203 the PUSCH comprising the piggy-backed UCI for example due to an overlap with a higher priority channel. Herein cancelling may also be referred to as dropping or deprioritizing. The UE stores 204, or buffers, the UCI comprised in the cancelled PUSCH. The base station transmits 205 an uplink grant for PUSCH, wherein the uplink grant comprises an indication to instruct the UE to retransmit the dropped UCI by multiplexing it with the PUSCH associated with the uplink grant. The UE receives 206 the uplink grant and, based on the indication in the uplink grant, multiplexes 207, or piggybacks, the dropped UCI on the PUSCH associated with the uplink grant. The UE transmits 208 the PUSCH associated with the uplink grant, wherein the transmitted PUSCH comprises the UCI that was previously dropped. In general, an uplink grant here refers generically to downlink control information (DCI) format scheduling PUSCH, which is transmitted on a physical downlink control channel, PDCCH.

The functions and/or blocks described above by means of FIG. 2 are in no absolute chronological order, and some of them may be performed simultaneously or in an order differing from the described one. Other functions and/or blocks may also be executed between them or within them.

Figure 3:
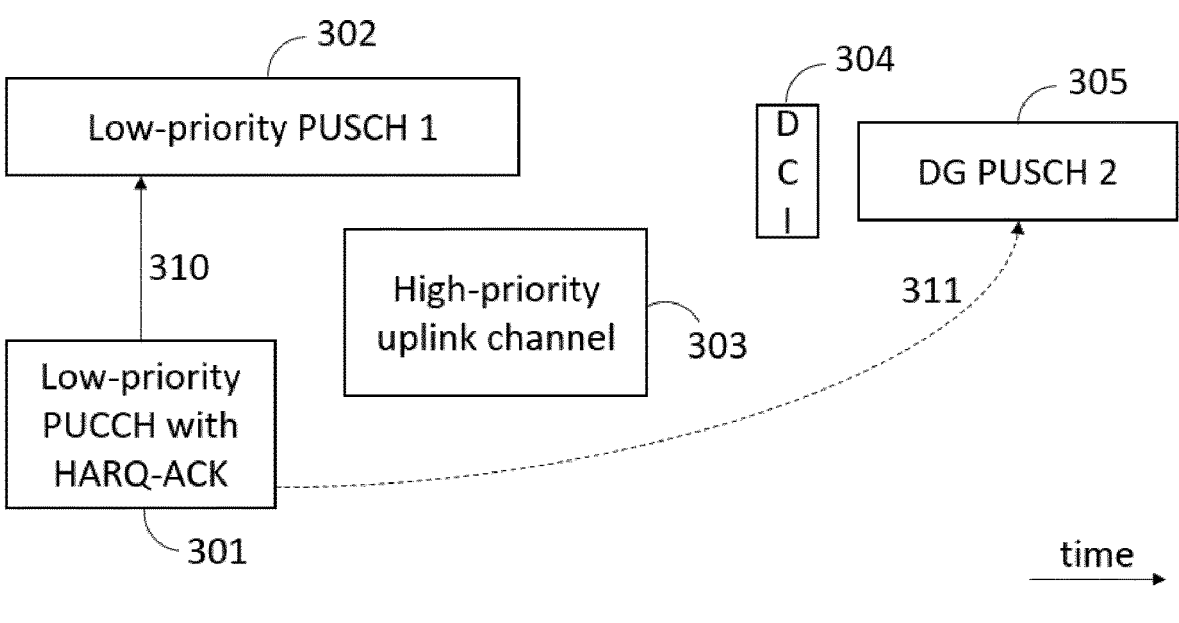
FIGS. 3-6 illustrate exemplary schemes according to some exemplary embodiments.

FIG. 3 illustrates an exemplary scheme for retransmitting a dropped HARQ-ACK according to an exemplary embodiment. In this exemplary embodiment, the HARQ-ACK is dropped due to deprioritizing a (DG/CG) PUSCH piggy-backing this HARQ-ACK due to overlap with a high-priority uplink channel/transmission, which may be a (CG/DG) PUSCH or a PUCCH (or even a sounding reference signal, SRS). The dropped HARQ-ACK may then be retransmitted on another low-priority PUSCH scheduled by an uplink grant.

Referring to FIG. 3, a low-priority PUCCH 301 comprising a HARQ-ACK overlaps with a first low-priority PUSCH 302 that overlaps with a high-priority uplink channel 303. The UE may handle the channels with the substantially same priority first, which may result in the UE deciding to multiplex 310, i.e. piggyback, the low-priority HARQ-ACK on the first low-priority (DG/CG) PUSCH 302. The first low-priority PUSCH 302 comprising the HARQ-ACK overlaps with the high-priority uplink channel 303, and thus the high-priority uplink channel 303 is prioritized and the first low-priority PUSCH 302 comprising the HARQ-ACK is dropped.

However, the network, for example a base station, may instruct the UE to buffer the dropped HARQ-ACK, or more generally the UCI, comprised in the dropped first low-priority PUSCH. Alternatively, the UE may be configured by default to buffer the dropped HARQ-ACK in such a case, without being explicitly instructed by the network to do so.

The network, for example the base station, may further instruct the UE on whether to retransmit the dropped HARQ-ACK on an upcoming uplink grant for a second DG PUSCH 305. The instructions to retransmit the dropped HARQ-ACK may be received for example via the DCI 304 of the uplink grant for the second DG PUSCH 305. In one alternative, a 1-bit field in the uplink grant may be used to carry the instructions, where value 1 instructs the UE to multiplex and retransmit the dropped HARQ-ACK on the scheduled second PUSCH 305, and value 0 instructs the UE to not retransmit the dropped HARQ-ACK on the second PUSCH 305. The absence of this field may be interpreted, for example, as to not multiplex the dropped HARQ-ACK. Alternatively, the instructions may be received via a separate DCI, or via MAC CE or RRC. As another alternative, the indication to retransmit the dropped HARQ-ACK may be signalled using a dedicated RNTI, Radio-Network Temporary Identifier, scrambling the DCI using which the uplink grant is scheduled. As a further alternative, a special DMRS, demodulation reference signal, sequence may be used as a way to signal the indication to retransmit the dropped HARQ-ACK, where the DMRS sequence is indicated in DCI.

If the instructions indicate to retransmit the dropped HARQ-ACK, the UE multiplexes 311 the dropped HARQ-ACK on the second DG PUSCH 305 of the upcoming uplink grant. The UE then transmits the second DG PUSCH 305 comprising the dropped HARQ-ACK feedback. The second DG PUSCH 305 may be of low priority or high priority.

The network may also configure the UE, for example via RRC or MAC CE, to transmit one or more of the last or first dropped UCIs, such as HARQ-ACK codebooks.

Figure 4:
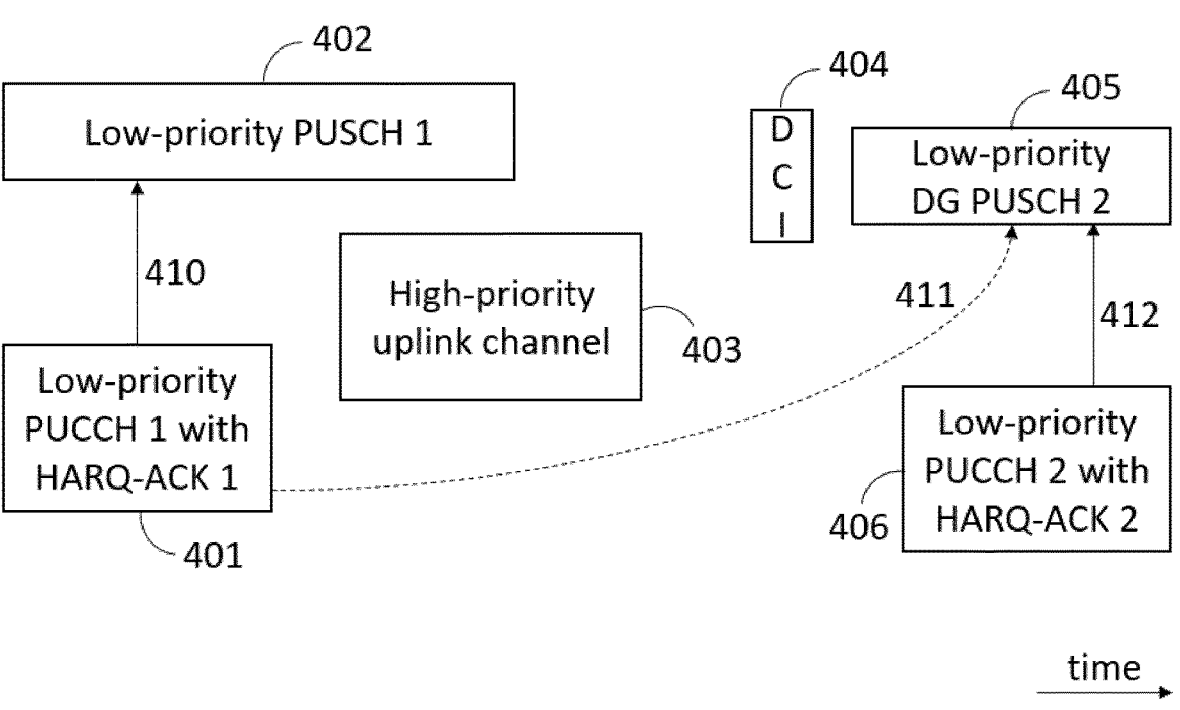

FIG. 4 illustrates another exemplary scheme for retransmitting a dropped HARQ-ACK according to an exemplary embodiment. This exemplary scheme is otherwise similar to the one depicted in FIG. 3, but in this exemplary scheme the second PUSCH on which the dropped HARQ-ACK is supposed to be multiplexed overlaps with a second PUCCH carrying another HARQ-ACK. Whether both HARQ-ACK codebooks can be entirely multiplexed on the second PUSCH, or if one HARQ-ACK codebook needs to be partially or fully dropped, may depend on the defined handling rule(s) and the available resources on that second PUSCH.

Referring to FIG. 4, a first low-priority PUCCH 401 comprising a first HARQ-ACK overlaps with a first low-priority (DG/CG) PUSCH 402 that overlaps with a high-priority uplink channel/transmission 403, which may be a (CG/DG) PUSCH or a PUCCH (or even an SRS). The UE may handle the channels with the substantially same priority first, which may result in the UE deciding to multiplex 410, i.e. piggyback, the first HARQ-ACK on the first low-priority PUSCH 402. The first low-priority PUSCH 402 comprising the first HARQ-ACK overlaps with the high-priority uplink channel 403, and thus the high-priority uplink channel 403 is prioritized and the first low-priority PUSCH 402 comprising the first HARQ-ACK is dropped.

The network, for example a base station, may instruct the UE to buffer the dropped first HARQ-ACK, or more generally the UCI, comprised in the dropped first low-priority PUSCH 402. Alternatively, the UE may be configured by default to buffer the dropped first HARQ-ACK in such a case, without being explicitly instructed by the network to do so. The network, for example the base station, may further instruct the UE to retransmit the dropped first HARQ-ACK on an upcoming uplink grant for a second PUSCH 405, where this second PUSCH may be of low or high PHY priority. In the example here, it is assumed that the second PUSCH 405 is of low priority. The instructions to retransmit the dropped first HARQ-ACK may be received for example via the DCI 404 of the uplink grant for the second PUSCH 405.

However, the second PUSCH 405, on which the dropped first HARQ-ACK is supposed to be multiplexed, overlaps with a second low-priority PUCCH 406 carrying a second HARQ-ACK. The following handling rule may be configured to handle this scenario for the substantially same UCI type and substantially same PHY priority of the concerned UCIs.

The dropped first HARQ-ACK may be considered of lower importance than the second PUCCH 406 with the second HARQ-ACK overlapping with the second PUSCH 405, on which the dropped first HARQ-ACK is supposed to be multiplexed. Thus, if there are not enough resources on the second PUSCH 405 to multiplex any bit of the already dropped first HARQ-ACK in addition to the second HARQ-ACK, then the already dropped first HARQ-ACK may again be fully dropped and the second HARQ-ACK is multiplexed 412 on the second PUSCH 405. On the other hand, if there are enough resources on the second PUSCH 405 for at least a part of the already dropped first HARQ-ACK in addition to the second HARQ-ACK, then the first HARQ-ACK may be at least partially multiplexed 411 on the second PUSCH 405 together with the second HARQ-ACK, which may be fully multiplexed 412 on the second PUSCH 405.

Alternatively, the first HARQ-ACK may be considered of higher importance and, if there are enough resources on the second PUSCH 405 for at least a part of the second HARQ-ACK in addition to the first HARQ-ACK, then the second HARQ-ACK may be at least partially multiplexed 412 on the second PUSCH 405 together with the first HARQ-ACK, which may be fully multiplexed 411 on the second PUSCH 405.

The handling rule may also depend on the PHY priority of the concerned UCIs as well as on the UCI type. For instance, the relative rule may be defined as follows: a high-priority UCI is considered of higher importance than a low-priority UCI. In this case, the rule may indicate to fully drop the UCI with lower importance. In other words, partial dropping or multiplexing may not be allowed in this case.

Figure 5:
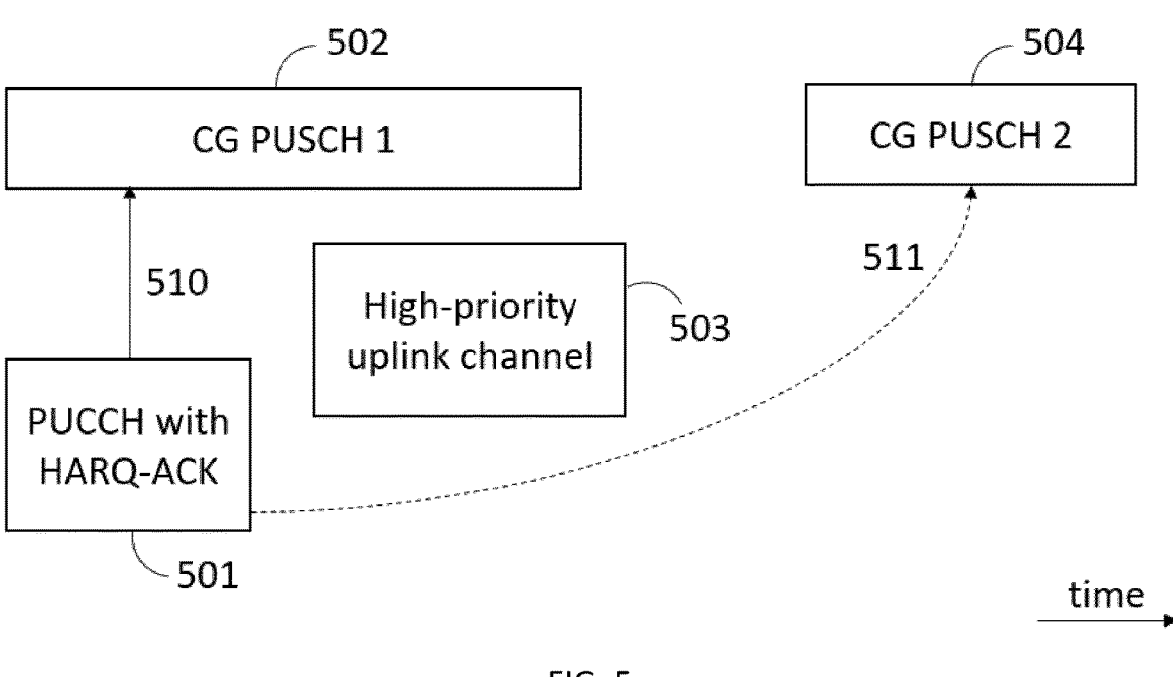

FIG. 5 illustrates another exemplary scheme for retransmitting a dropped HARQ-ACK according to an exemplary embodiment. In this exemplary scheme, the PUSCH piggybacking the HARQ-ACK is cancelled due to an overlap with a high-priority uplink channel, and the dropped HARQ-ACK is transmitted in an upcoming CG PUSCH.

Referring to FIG. 5, a low-priority PUCCH 501 comprising a HARQ-ACK overlaps with a first CG PUSCH 502. Thus, the UE decides to multiplex 510 the HARQ-ACK on the first CG PUSCH 502. The first CG PUSCH 502, which is associated with a first CG configuration, and on which the HARQ-ACK is supposed to be multiplexed, is dropped on PHY due to an overlap with a higher-priority uplink channel 503, for example. Assuming that the UE is allowed, for example by RRC configuration or through activation DCI for the first CG configuration, to attempt transmitting the dropped HARQ-ACK on upcoming CG PUSCH occasion(s), the UE multiplexes 511 the dropped HARQ-ACK on a second CG PUSCH 504. The second CG PUSCH 504 may be associated with the first CG configuration or a second CG configuration.

If the next available PUSCH occasion is one belonging to the first CG configuration, i.e. the CG configuration for which the first CG PUSCH has been dropped, and the UE is performing autonomous retransmission for the dropped transport block, then the UE may also be configured to transmit the dropped HARQ-ACK by multiplexing it on the PUSCH used for the autonomous retransmission of the transport block.

The network may control, for example via RRC or as part of the activation DCI (if any), on a per CG configuration basis whether the UE may transmit the dropped HARQ-ACK on the next PUSCH occasion(s) of the substantially same configuration. Alternatively, the network may control this operation for some or all of the CG configurations at a time by having an indication that turns this operation on or off for some or all of the CG configurations.

Figure 6:
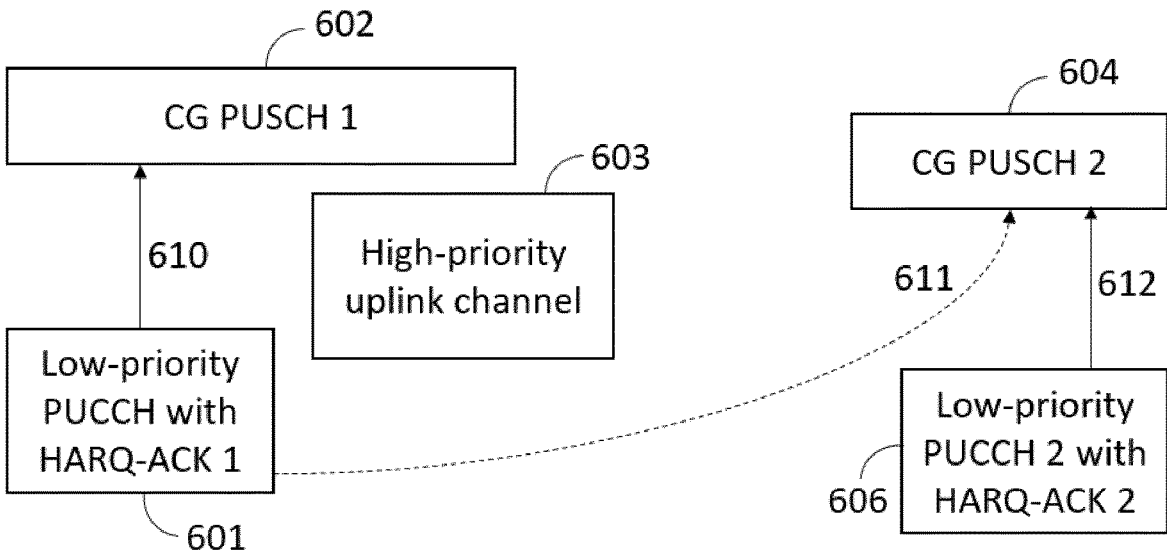

FIG. 6 illustrates another exemplary scheme for retransmitting a dropped HARQ-ACK according to an exemplary embodiment. In this exemplary scheme, the PUSCH piggybacking the HARQ-ACK is cancelled due to an overlap with a high-priority uplink channel 603, and thus the HARQ-ACK is dropped. As previously mentioned, other events may also lead to dropping the PUSCH piggybacking the HARQ-ACK, such as receiving an uplink cancellation indication.

Referring to FIG. 6, a low-priority PUCCH 601 comprising a first HARQ-ACK overlaps with a first CG PUSCH 602. Thus, the UE decides to multiplex 610 the first HARQ-ACK on the first CG PUSCH 602. The first CG PUSCH 602, which is associated with a first CG configuration, on which the first HARQ-ACK is supposed to be multiplexed, overlaps with a higher priority uplink channel 603, and thus the first CG PUSCH 602 is dropped on PHY. Assuming that the UE is allowed, for example by RRC configuration or through activation DCI for the first CG configuration, to attempt transmitting the dropped first HARQ-ACK on upcoming CG PUSCH occasion(s), the UE may decide to multiplex 611 the dropped first HARQ-ACK on a second CG PUSCH 604. Similar to the exemplary embodiment of FIG. 5, the second CG PUSCH 604 may be associated with the first CG configuration or a second CG configuration.

If the next available PUSCH occasion is one belonging to the first CG configuration, i.e. the CG configuration for which the first CG PUSCH has been dropped, and the UE is performing autonomous retransmission for the dropped transport block, then the UE may also be configured to decide to multiplex the dropped first HARQ-ACK on the PUSCH transmission used for the autonomous retransmission of the transport block.

The network may control, for example via RRC or as part of the activation DCI (if any), on a per CG configuration basis whether the UE may decide to multiplex the dropped first HARQ-ACK on the next PUSCH transmission occasion(s) of the substantially same configuration. Alternatively, the network may control this operation for some or all of the CG configurations at a time by having an indication that turns this operation on or off for some or all of the CG configurations.

However, the second CG PUSCH 604, on which the dropped first HARQ-ACK is supposed to be multiplexed, overlaps with a second low-priority PUCCH 606 carrying a second HARQ-ACK. The UE may then determine which of the HARQ-ACKs has higher importance. This determination may be based on some predefined rules or based on some handling rules configured by the network, in a similar way as the exemplary embodiment of FIG. 4.

If the first HARQ-ACK is considered of lower importance than the second PUCCH 606 with the second HARQ-ACK, and if there are not enough resources on the second CG PUSCH 604 to multiplex any bit of the first HARQ-ACK in addition to the second HARQ-ACK, then the first HARQ-ACK may again be fully dropped and the second HARQ-ACK is multiplexed 612 on the second CG PUSCH 604. On the other hand, if there are enough resources on the second CG PUSCH 604 for at least a part of the first HARQ-ACK in addition to the second HARQ-ACK, then the first HARQ-ACK may be at least partially multiplexed 611 on the second CG PUSCH 604 together with the second HARQ-ACK, which may be fully multiplexed 612 on the second CG PUSCH 604.

Alternatively, if the first HARQ-ACK is considered of higher importance than the second HARQ-ACK, then the first HARQ-ACK may be fully multiplexed 611 on the second CG PUSCH 604. If there are enough resources on the second CG PUSCH 604 for at least a part of the second HARQ-ACK in addition to the first HARQ-ACK, then the second HARQ-ACK may be at least partially multiplexed 612 on the second CG PUSCH 604 together with the first HARQ-ACK. However, if there are not enough resources on the second CG PUSCH 604 to multiplex any bit of the second HARQ-ACK in addition to the first HARQ-ACK, then the second HARQ-ACK may be fully dropped from the second CG PUSCH 604.

Instead of or in addition to HARQ-ACK retransmission, the exemplary embodiments described above may also be applied to other UCI types, such as channel state information, CSI and/or scheduling request, SR. In other words, the UCI may comprise, for example, a HARQ-ACK, SR, and/or CSI.

Figures 7, 8:
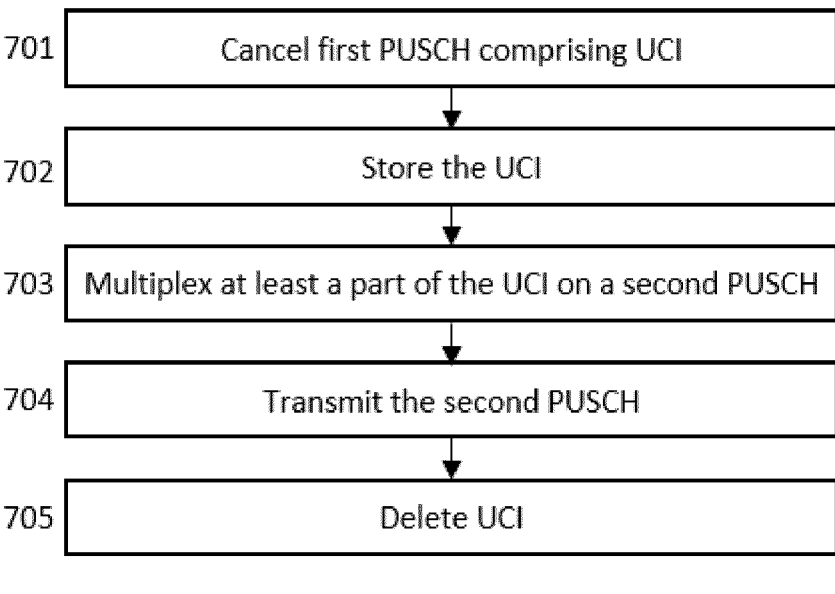
FIGS. 7-12 illustrate flow charts according to some exemplary embodiments.

FIG. 7 illustrates a flow chart according to an exemplary embodiment. The functions illustrated in FIG. 7 may be performed by an apparatus such as a UE. Transmission of a first physical uplink shared channel comprising a first set of uplink control information is cancelled 701. Herein cancelling may also refer to dropping or deprioritizing the first physical uplink shared channel. The first set of uplink control information is stored 702 for example in an internal memory of the apparatus. Herein storing may also refer to buffering the first set of uplink control information. At least a part of the first set of uplink control information is multiplexed 703 on a second physical uplink shared channel. The second physical uplink shared channel comprising the at least part of the first set of uplink control information is transmitted 704 to a base station. The first set of uplink control information is deleted 705 from the internal memory of the UE after it has been transmitted.

FIG. 8 illustrates a flow chart according to an exemplary embodiment. The functions illustrated in FIG. 8 may be performed by an apparatus such as a UE. A configuration comprising instructions to store the UCI comprised in a PUSCH, in case the PUSCH is cancelled on the PHY layer, is received 801 from a base station. The configuration may be received via an RRC configuration, a MAC CE, and/or DCI. The configuration is applied 802.

A first PUSCH comprising the UCI is cancelled 803. Herein cancelling may also refer to dropping or deprioritizing the first PUSCH. The UCI is stored 804 for example in an internal memory of the apparatus. Herein storing may also refer to buffering the UCI.

An indication to transmit at least a part of the UCI on any uplink grant for PUSCH, for example a second PUSCH, is received 805. The indication may be received via an RRC configuration, a MAC CE, and/or DCI. For example, the base station may configure the UE, for example via RRC or MAC CE, to transmit one or more of the last or first dropped UCIs. Alternatively, the number of the last or first dropped UCIs to be transmitted may be dynamically indicated via DCI. The indication may be received via DCI for example in case of a dynamically scheduled PUSCH and/or in case of configured grant type 2 through the activation DCI. Alternatively or additionally, the indication may be received via RRC or MAC CE for example for a configured grant PUSCH transmission, where the indication may be per configured grant configuration or common for some or all of the configured grant configurations.

At least a part of the UCI is multiplexed 806 on the second PUSCH. The second PUSCH comprising the at least part of the UCI is transmitted 807 to the base station. The UCI is deleted 808 from the internal memory of the UE after it has been transmitted.

In some exemplary embodiments, the uplink grant, i.e. indication, used may be a retransmission grant for retransmitting the substantially same transport block, i.e. data of a certain uplink HARQ process, of the cancelled first PUSCH. If the indication is to transmit the dropped UCI, the UE multiplexes the dropped UCI on the second PUSCH scheduled by the retransmission grant. The indication for retransmission with the substantially same transport block may be received via DCI for example in case of a dynamic retransmission grant. Alternatively or additionally, the indication/configuration may be via RRC, for example in case of autonomous configured grant PUSCH retransmission. It may be indicated per configured grant configuration or common for some or all of the configured grant configurations.

Figure 9:
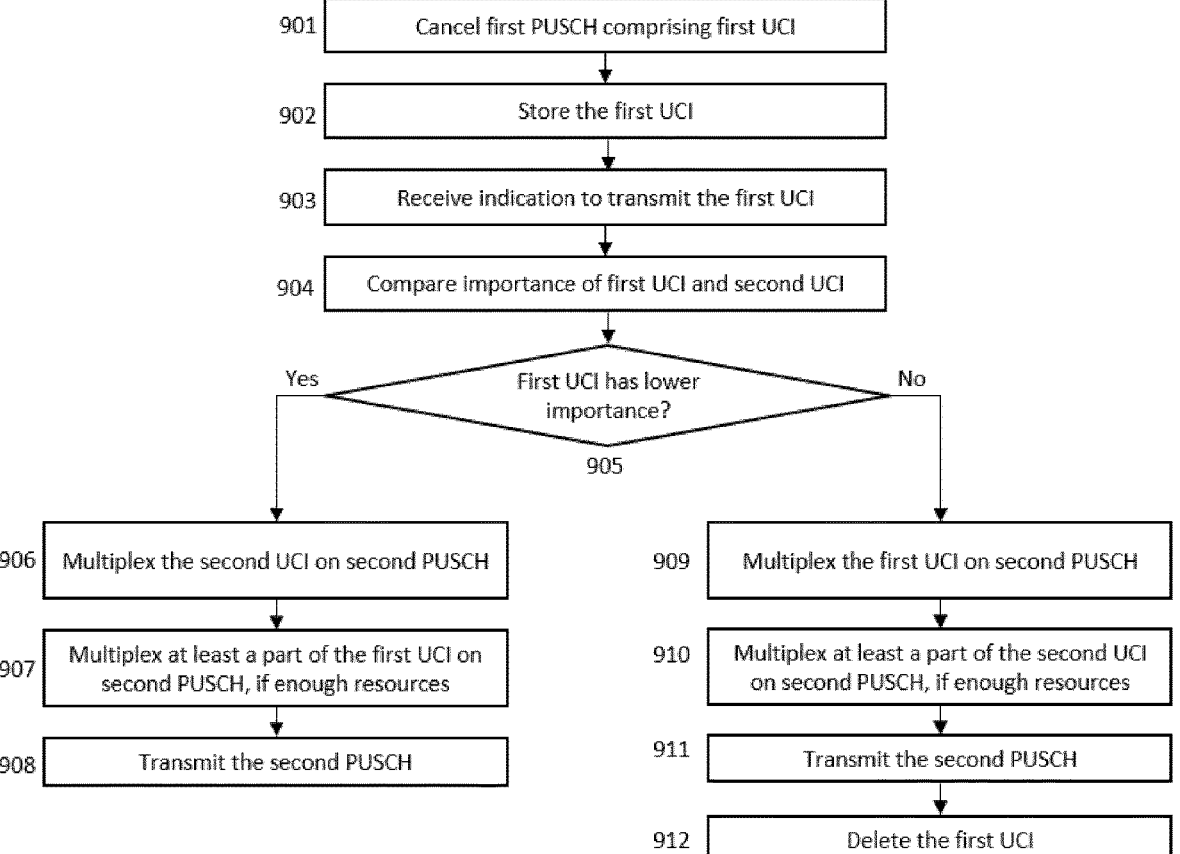

FIG. 9 illustrates a flow chart according to an exemplary embodiment, wherein the UE is configured with handling rule(s), i.e. multiplexing and/or prioritization rule(s), for cases where the second PUSCH on which the dropped UCI is supposed to be multiplexed has another UCI to be multiplexed on.

Referring to FIG. 9, a first PUSCH comprising a first UCI is cancelled 901. The first UCI is stored 902 for example in an internal memory of the UE. Herein storing may also refer to buffering the UCI. An indication to transmit the first UCI on a second PUSCH is received 903 from a base station.

An importance of the first UCI is compared 904 against an importance of a second UCI that is also supposed to be multiplexed on the second PUSCH. The rule(s) for determining the importance of the UCIs may depend on the type and/or PHY priorities of the UCIs.

If the first UCI and the second UCI have substantially the same UCI type and substantially the same PHY priority, then the dropped first UCI may be considered of higher or lesser importance than the second UCI depending on the configuration. This may be useful for cases where there are not enough resources for multiplexing both UCIs on the second PUSCH, and thus one UCI, i.e. the one with less importance, may be partially or fully dropped from the second PUSCH.

The importance of the first and second UCI may depend on the UCI type. For example, a newer CSI may have higher priority than an older CSI, or the older CSI may not be re-transmitted if a newer CSI is to be mapped, whereas for example for HARQ-ACK a different procedure may be applicable.

If the first UCI and the second UCI have different PHY priorities, then the UCI with a higher PHY priority may be considered to be of higher importance. For example, the dropped first UCI may be of higher importance if its PHY priority is higher than that of the second UCI.

If the first UCI is determined to have lower importance than the second UCI (905: yes), then the second UCI is (fully) multiplexed 906 on the second PUSCH. If there are enough resources on the second PUSCH, then at least a part of the first UCI may also be multiplexed 907 on the second PUSCH in addition to the second UCI. Herein resources may refer to resource elements (REs), for example. In other words, the UE may multiplex a portion of the first UCI that is equivalent to the REs that are available on the second PUSCH after the second UCI has been (fully) multiplexed on the second PUSCH. The second PUSCH is transmitted 908.

If the first UCI is determined to have higher importance than the second UCI (905: no), then the first UCI is (fully) multiplexed 909 on the second PUSCH. If there are enough resources on the second PUSCH, then at least a part of the second UCI may also be multiplexed 910 on the second PUSCH in addition to the first UCI. Herein resources may refer to REs, for example. In other words, the UE may multiplex a portion of the second UCI that is equivalent to the REs that are available on the second PUSCH after the first UCI has been (fully) multiplexed on the second PUSCH. The second PUSCH is transmitted 911. The first UCI is deleted 912 from the internal memory of the UE after it has been transmitted.

Some exemplary embodiments may provide mechanisms to enable reducing the UCI payload size, when multiplexing multiple UCIs of more than one PUCCH occasions, i.e. both the second UCI and the first UCI, on the second PUSCH. For example, HARQ-ACK bundling may be applied for the UCI of lower importance, when multiplexing it on the second PUSCH together with the UCI of higher importance. FIG.

10 illustrates a flow chart according to an exemplary embodiment, wherein the first UCI and the second UCI may both be multiplexed on the second PUSCH and the payload size of the UCI with less importance is reduced.

Figure 10:
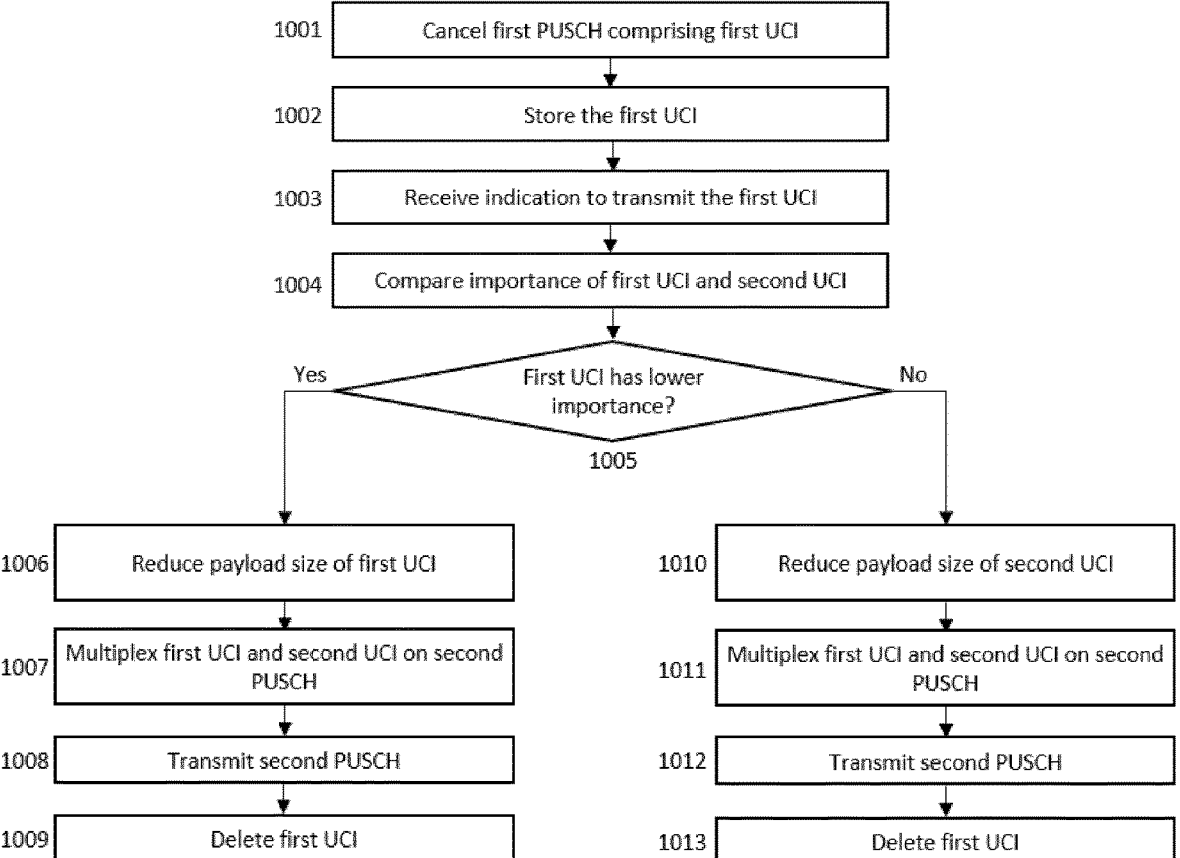

Referring to FIG. 10, a first PUSCH comprising a first UCI is cancelled 1001. The first UCI is stored 1002 for example in an internal memory of the UE. Herein storing may also refer to buffering the UCI. An indication to transmit the first UCI on a second PUSCH is received 1003 from a base station.

An importance of the first UCI is compared 1004 against an importance of a second UCI that is also supposed to be multiplexed on the second PUSCH. The rule(s) for determining the importance of the UCIs may depend on the type and/or PHY priorities of the UCIs.

If the first UCI is determined to have lower importance than the second UCI (1005: yes), then the payload size of the first UCI is reduced 1006. The first UCI with reduced payload size and the second UCI are multiplexed 1007 on the second PUSCH, and transmitted 1008 to the base station on the second PUSCH. The first UCI is deleted 1009 from the internal memory of the UE after it has been transmitted.

If the first UCI is determined to have higher importance than the second UCI (1005: no), then the payload size of the second UCI is reduced 1010. The second UCI with reduced payload size and the first UCI are multiplexed 1011 on the second PUSCH, and transmitted 1012 to the base station on the second PUSCH. The first UCI is deleted 1013 from the internal memory of the UE after it has been transmitted.

Figure 11:
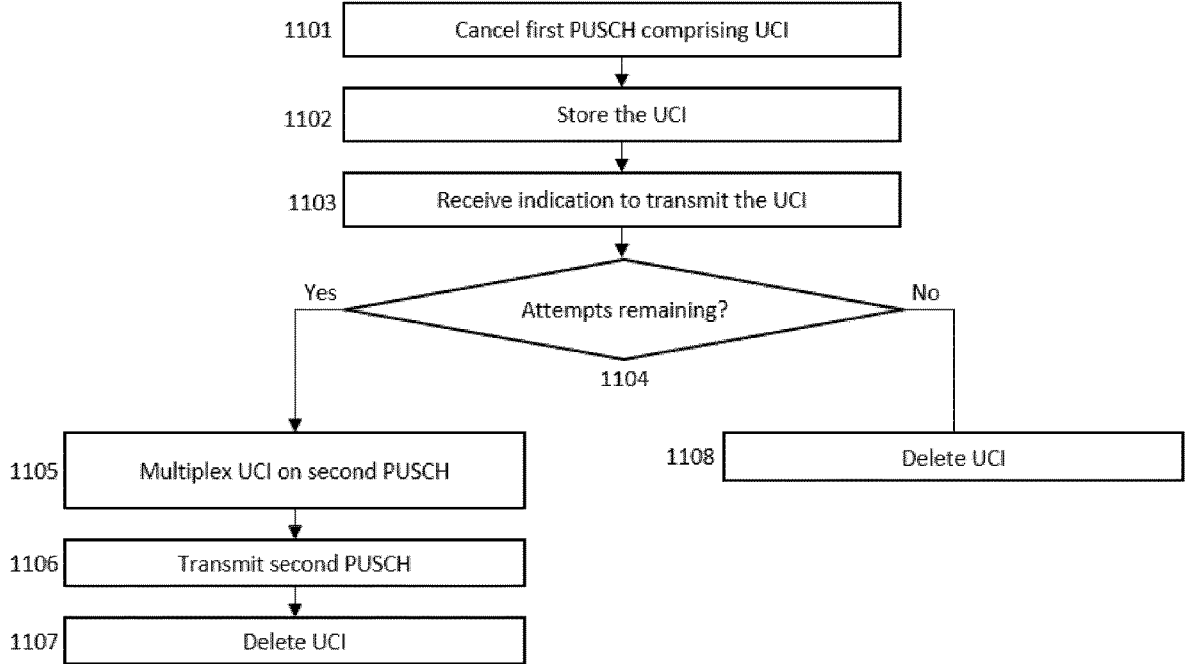

In some exemplary embodiments, the network may configure the UE with a maximum number of attempts for transmitting the dropped UCI, for example in cases where the indication to transmit the dropped UCI is received via RRC. Alternatively, the network may configure the UE with a timer for transmitting the dropped UCI, where the UE stops attempting to transmit the dropped UCI once the timer expires. FIG. 11 illustrates a flow chart according to an exemplary embodiment, wherein the UE checks if attempts are remaining before multiplexing and transmitting the dropped UCI on the second PUSCH.

Referring to FIG. 11, a first PUSCH comprising the UCI is cancelled 1101. The UCI is stored 1102 for example in an internal memory of the UE. Herein storing may also refer to buffering the UCI.

An indication to transmit the dropped UCI on a second PUSCH is received 1103 from a base station. The UE then checks 1104, for example based on a pre-defined maximum limit of attempts or a pre-defined timer, whether there are attempts remaining for transmitting the dropped UCI. In other words, the UE checks whether a pre-defined timer is expired or a pre-defined maximum number of attempts for transmitting the UCI is reached.

If there are attempts remaining (1104: yes), then at least a part of the dropped UCI is multiplexed 1105 on the second PUSCH. The second PUSCH comprising the at least part of the dropped UCI is transmitted 1106 to the base station. The UCI is deleted 1107 from the internal memory of the UE after the UCI has been transmitted on the second PUSCH.

If there are no attempts remaining (1104: no), then the dropped UCI is not multiplexed on the second PUSCH, and the dropped UCI is deleted 1108 from the internal memory of the UE.

The exemplary embodiment illustrated in FIG. 11 may also be combined with the exemplary embodiment illustrated in FIG. 9 or with the exemplary embodiment illustrated in FIG. 10. For example, if there are attempts remaining (1104: yes), and there is a second UCI overlapping the first UCI, then the UE may compare the importance of the first UCI and the second UCI according to block 904 of FIG. 9 or block 1004 of FIG. 10, and continue from there as illustrated in FIG. 9 or FIG. 10, respectively.

Figure 12:
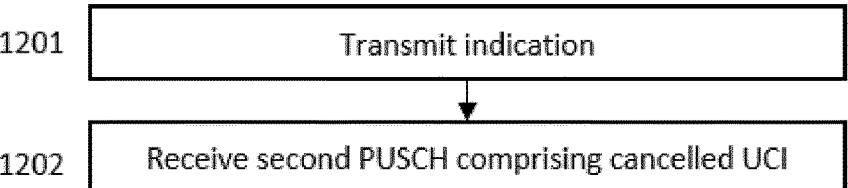

FIG. 12 illustrates a flow chart according to an exemplary embodiment. The functions illustrated in FIG. 12 may be performed by an apparatus such as a base station, or an apparatus comprised in a base station.

Referring to FIG. 12, an indication to transmit a first set of uplink control information on a second physical uplink shared channel is transmitted 1201 to a terminal device, wherein the first set of uplink control information is associated with a cancelled first physical uplink shared channel. The second physical uplink shared channel comprising at least a part of the first set of uplink control information is received 1202 from the terminal device.

In another exemplary embodiment, the base station or an apparatus comprised in the base station transmits, to the terminal device, a configuration comprising instructions to store the first set of uplink control information in case the first physical uplink shared channel is cancelled. The configuration may be transmitted to the terminal device prior to transmitting the indication to transmit the first set of uplink control information on the second physical uplink shared channel.

The functions and/or blocks described above by means of FIGS. 7-12 are in no absolute chronological order, and some of them may be performed simultaneously or in an order differing from the described one. Other functions and/or blocks may also be executed between them or within them.

A technical advantage provided by some exemplary embodiments may be that they may provide a solution to avoid losing the dropped UCI, such as HARQ-ACK feedback, SR and/or CSI, which may result in a reduced number of PDSCH retransmissions and corresponding PDCCH transmissions. Thus, network performance may be increased at least in terms of latency and downlink efficiency. In addition, some exemplary embodiments may be applicable using the legacy HARQ codebook operation (type 1 & type 2) as well, as it may provide flexibility by the gNB configuration or indication to enable the UCI retransmission as needed from the network perspective.

Figure 13:
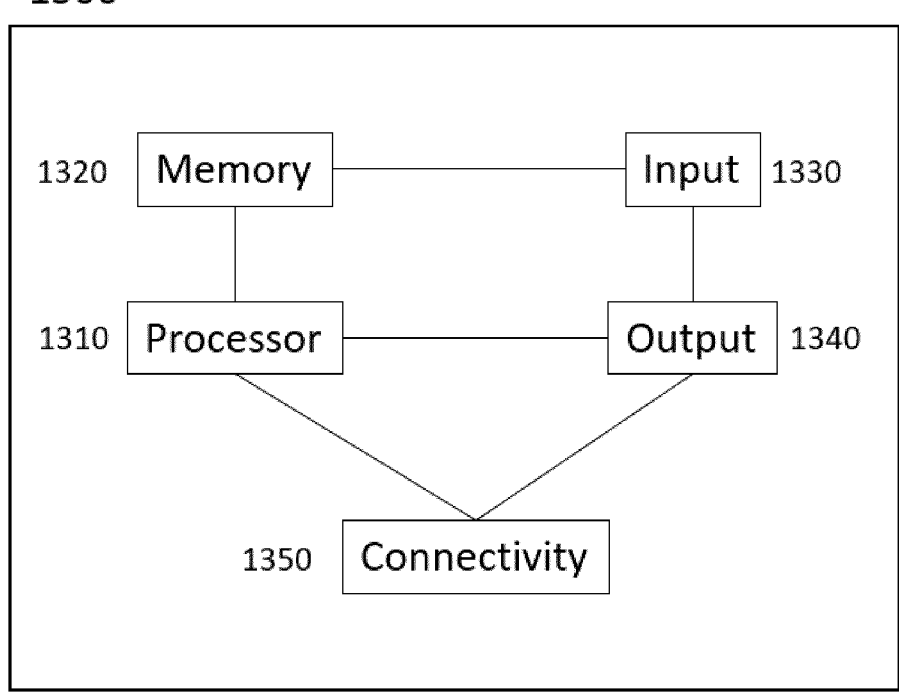
FIGS. 13-14 illustrate apparatuses according to exemplary embodiments.

FIG. 13 illustrates an apparatus 1300, which may be an apparatus such as, or comprised in, a terminal device, according to an exemplary embodiment. The terminal device may also be referred to as a UE herein. The apparatus 1300 comprises a processor 1310. The processor 1310 interprets computer program instructions and processes data. The processor 1310 may comprise one or more programmable processors. The processor 1310 may comprise programmable hardware with embedded firmware and may, alternatively or additionally, comprise one or more application specific integrated circuits, ASICs.

The processor 1310 is coupled to a memory 1320. The processor is configured to read and write data to and from the memory 1320. The memory 1320 may comprise one or more memory units. The memory units may be volatile or non-volatile. It is to be noted that in some exemplary embodiments there may be one or more units of non-volatile memory and one or more units of volatile memory or, alternatively, one or more units of non-volatile memory, or, alternatively, one or more units of volatile memory. Volatile memory may be for example RAM, DRAM or SDRAM. Non-volatile memory may be for example ROM, PROM, EEPROM, flash memory, optical storage or magnetic storage. In general, memories may be referred to as non-transitory computer readable media. The memory 1320 stores computer readable instructions that are executed by the processor 1310. For example, non-volatile memory stores the computer readable instructions and the processor 1310 executes the instructions using volatile memory for temporary storage of data and/or instructions.

The computer readable instructions may have been pre-stored to the memory 1320 or, alternatively or additionally, they may be received, by the apparatus, via an electromagnetic carrier signal and/or may be copied from a physical entity such as a computer program product. Execution of the computer readable instructions causes the apparatus 1300 to perform one or more of the functionalities described above.

In the context of this document, a "memory" or "computer-readable media" or "computer-readable medium" may be any non-transitory media or medium or means that can contain, store, communicate, propagate or transport the instructions for use by or in connection with an instruction execution system, apparatus, or device, such as a computer.

The apparatus 1300 may further comprise, or be connected to, an input unit 1330. The input unit 1330 may comprise one or more interfaces for receiving input. The one or more interfaces may comprise for example one or more temperature, motion and/or orientation sensors, one or more cameras, one or more accelerometers, one or more microphones, one or more buttons and/or one or more touch detection units. Further, the input unit 1330 may comprise an interface to which external devices may connect to.

The apparatus 1300 may also comprise an output unit 1340. The output unit may comprise or be connected to one or more displays capable of rendering visual content such as a light emitting diode, LED, display, a liquid crystal display, LCD and a liquid crystal on silicon, LCoS, display. The output unit 1340 may further comprise one or more audio outputs. The one or more audio outputs may be for example loudspeakers.

The apparatus 1300 further comprises a connectivity unit 1350. The connectivity unit 1350 enables wireless connectivity to one or more external devices. The connectivity unit 1350 comprises at least one transmitter and at least one receiver that may be integrated to the apparatus 1300 or that the apparatus 1300 may be connected to. The at least one transmitter comprises at least one transmission antenna, and the at least one receiver comprises at least one receiving antenna. The connectivity unit 1350 may comprise an integrated circuit or a set of integrated circuits that provide the wireless communication capability for the apparatus 1300. Alternatively, the wireless connectivity may be a hardwired application specific integrated circuit, ASIC. The connectivity unit 1350 may comprise one or more components such as a power amplifier, digital front end, DFE, analog-to-digital converter, ADC, digital-to-analog converter, DAC, frequency converter, (de)modulator, and/or encoder/decoder circuitries, controlled by the corresponding controlling units.

It is to be noted that the apparatus 1300 may further comprise various components not illustrated in FIG. 13. The various components may be hardware components and/or software components.

Figure 14:
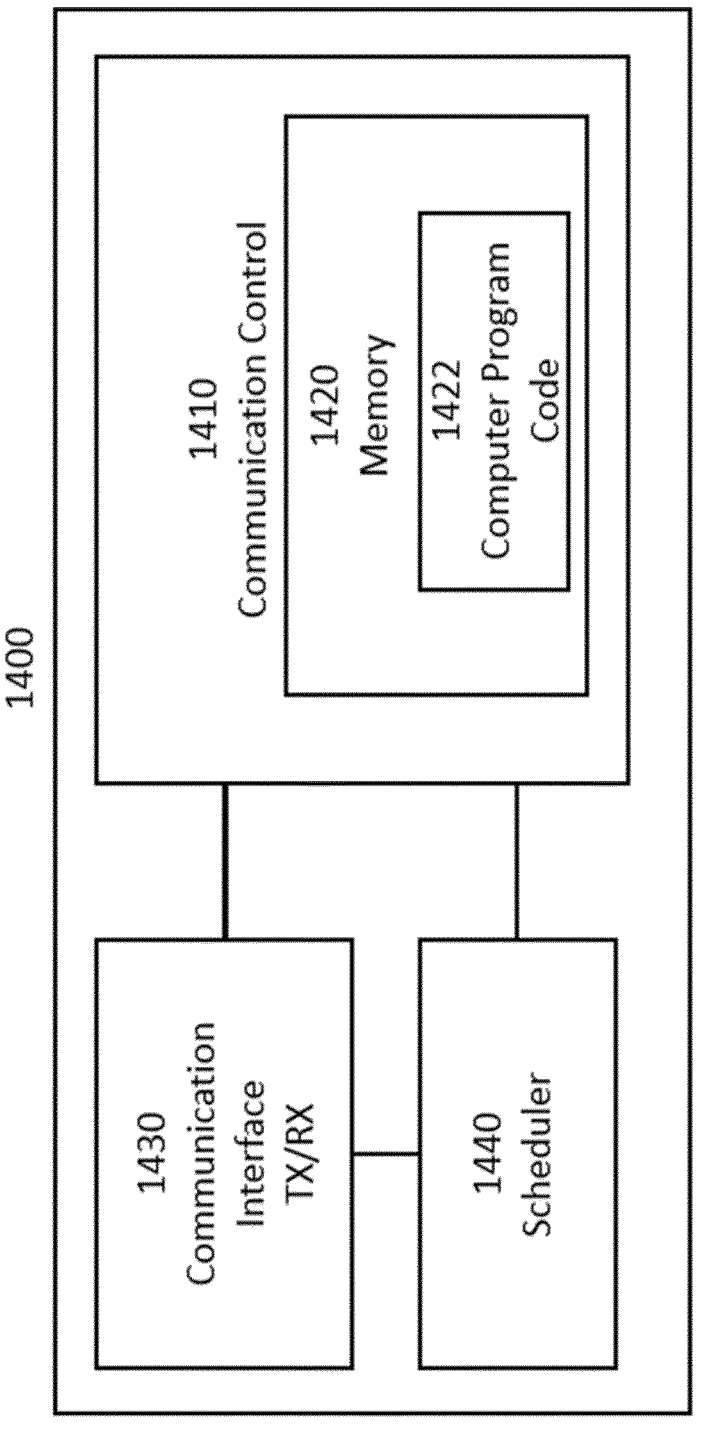

The apparatus 1400 of FIG. 14 illustrates an exemplary embodiment of an apparatus such as, or comprised in, a base station such as a gNB. The apparatus may comprise, for example, a circuitry or a chipset applicable to a base station to realize some of the described exemplary embodiments. The apparatus 1400 may be an electronic device comprising one or more electronic circuitries. The apparatus 1400 may comprise a communication control circuitry 1410 such as at least one processor, and at least one memory 1420 including a computer program code (software) 1422 wherein the at least one memory and the computer program code (software) 1422 are configured, with the at least one processor, to cause the apparatus 1400 to carry out some of the exemplary embodiments described above.

The memory 1420 may be implemented using any suitable data storage technology, such as semiconductor-based memory devices, flash memory, magnetic memory devices and systems, optical memory devices and systems, fixed memory and/or removable memory. The memory may comprise a configuration database for storing configuration data. For example, the configuration database may store a current neighbour cell list, and, in some exemplary embodiments, structures of the frames used in the detected neighbour cells.

The apparatus 1400 may further comprise a communication interface 1430 comprising hardware and/or software for realizing communication connectivity according to one or more communication protocols. The communication interface 1430 may provide the apparatus with radio communication capabilities to communicate in the cellular communication system. The communication interface may, for example, provide a radio interface to terminal devices. The apparatus 1400 may further comprise another interface towards a core network such as the network coordinator apparatus and/or to the access nodes of the cellular communication system. The apparatus 1400 may further comprise a scheduler 1440 that is configured to allocate resources.

As used in this application, the term "circuitry" may refer to one or more or all of the following:

a. hardware-only circuit implementations (such as implementations in only analog and/or digital circuitry) and b. combinations of hardware circuits and software, such as (as applicable):

i. a combination of analog and/or digital hardware circuit(s) with software/firmware and ii. any portions of hardware processor(s) with software (including digital signal processor(s)), software, and memory(ies) that work together to cause an apparatus, such as a mobile phone, to perform various functions) and c. hardware circuit(s) and or processor(s), such as a microprocessor(s) or a portion of a microprocessor(s), that requires software (for example firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The techniques and methods described herein may be implemented by various means. For example, these techniques may be implemented in hardware (one or more devices), firmware (one or more devices), software (one or more modules), or combinations thereof. For a hardware implementation, the apparatus(es) of exemplary embodiments may be implemented within one or more application-specific integrated circuits (ASICs), digital signal processors (DSPs), digital signal processing devices (DSPDs), programmable logic devices (PLDs), field programmable gate arrays (FPGAs), graphics processing units (GPUs), processors, controllers, micro-controllers, microprocessors, other electronic units designed to perform the functions described herein, or a combination thereof. For firmware or software, the implementation can be carried out through modules of at least one chipset (for example procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

It will be obvious to a person skilled in the art that, as technology advances, the inventive concept may be implemented in various ways. The embodiments are not limited to the exemplary embodiments described above, but may vary within the scope of the claims. Therefore, all words and expressions should be interpreted broadly, and they are intended to illustrate, not to restrict, the exemplary embodiments.

LIST OF ABBREVIATIONS

4G: fourth generation
5G: fifth generation
CG: configured grant
CN: core network
CPS: cyber-physical system
CSI: channel state information
CU: central unit
DCI: downlink control information
DG: dynamic grant
DMRS: demodulation reference signal
DU: distributed unit
eMBB: enhanced mobile broadband
GEO: geostationary earth orbit
gNB: next generation nodeB
HARQ-ACK: hybrid automatic repeat request acknowledgement
HNB-GW: home node B gateway
IIoT: industrial internet of things
IMS: internet protocol multimedia subsystem
IoT: internet of things
LEO: low earth orbit
LTE: long term evolution
LTE-A: long term evolution advanced
M2M: machine-to-machine
MAC CE: medium access control control element
MAC: medium access control
MANET: mobile ad-hod network
MEC: multi-access edge computing
MIMO: multiple input and multiple output
MME: mobility management entity
mMTC: massive machine-type communications
NGC: next generation core
NR: new radio
NFV: network function virtualization
PCS: personal communications services
PDA: personal digital assistant
PDCCH: physical downlink control channel
PDSCH: physical downlink shared channel PDU: protocol data unit
P-GW: packet data network gateway
PHY: physical
PRB: physical resource block
PUCCH: physical uplink control channel
PUSCH: physical uplink shared channel
RAN: radio access network
RAT: radio access technology
RE: resource element
RI: radio interface
RNTI: radio network temporary identifier
RRC: radio resource control
SDN: software defined networking
S-GW: serving gateway
SIM: subscriber identification module
SR: scheduling request
SRS: sounding reference signal
UCI: uplink control information
UE: user equipment
UL CI: uplink cancellation indication
UMTS: universal mobile telecommunications system
URLLC: ultra-reliable low-latency communication
UTRAN: UMTS radio access network
UWB: ultra-wideband
WCDMA: wideband code division multiple access
WiMAX: worldwide interoperability for microwave access
WLAN: wireless local area network

The invention claimed is:

1. An apparatus comprising at least one processor, and at least one memory including computer program code, wherein the at least one memory and the computer program code are configured, with the at least one processor, to cause the apparatus to:
cancel a first physical uplink shared channel comprising a first set of uplink control information;
store the first set of uplink control information;
receive, from a base station, an indication to transmit the first set of stored uplink control information on a second physical uplink shared channel;
responsive to the indication, multiplex at least a part of the stored first set of uplink control information on the second physical uplink shared channel;
transmit, to the base station, the second physical uplink shared channel; and
delete the stored first set of uplink control information after the transmitting,
wherein the cancelling of the first physical uplink shared channel occurs due to at least one of: an overlap with a higher-priority uplink channel, an overlap with downlink symbols, and an uplink cancellation indication for inter-user equipment prioritization;
wherein the indication is carried in downlink control information scheduling a second physical uplink shared channel and comprises a one-bit field indicating whether to retransmit the stored first set of uplink control information on the second physical uplink shared channel; and
wherein the second physical uplink shared channel is scheduled by a retransmission uplink grant and comprises a transport block of the cancelled first physical uplink shared channel.

2. The apparatus according to claim 1, wherein the at least one processor is further configured to cause the apparatus to:

receive, from the base station, a configuration comprising instructions to store the first set of uplink control information, if the first physical uplink shared channel is cancelled; and
apply the configuration.

3. The apparatus according to claim 1, wherein the cancelling occurs responsive to an uplink cancellation indication for inter-user equipment prioritization and further responsive to at least one of: an overlap with a higher-priority uplink channel or an overlap with downlink symbols.

4. The apparatus according to claim 3,
wherein the indication is received in downlink control information that schedules the second physical uplink shared channel and the downlink control information comprises the one-bit field indicating whether to retransmit the stored first set of uplink control information on the second physical uplink shared channel.

5. The apparatus according to claim 1, wherein the at least one processor is further configured to cause the apparatus to:
delete the stored first set of uplink control information:
after transmitting the second physical uplink shared channel that multiplexes the stored first set of uplink control information; and
when the second physical uplink shared channel is not transmitted, in response to at least one of: a pre-defined timer expiring or a pre-defined maximum number of attempts being reached.

6. The apparatus according to claim 1, wherein the retransmission uplink grant corresponds to a hybrid automatic repeat request process identifier of the cancelled first physical uplink shared channel.

7. The apparatus according to claim 1, wherein the at least one processor is further configured to cause the apparatus to:
multiplex the at least part of the first set of uplink control information on the second physical uplink shared channel, if there are enough resources on the second physical uplink shared channel for the at least part of the first set of uplink control information.

8. The apparatus according to claim 1, wherein the at least one processor is further configured to cause the apparatus to:
reduce a payload size of the first set of uplink control information.

9. The apparatus according to claim 1, wherein the at least one processor is further configured to cause the apparatus to:
multiplex at least a part of a second set of uplink control information on the second physical uplink shared channel.

10. The apparatus according to claim 9, wherein the at least one processor is further configured to cause the apparatus to:
reduce a payload size of the second set of uplink control information.

11. The apparatus according to claim 9, wherein the at least one processor is further configured to cause the apparatus to:
compare an importance of the first set of uplink control information and an importance of the second set of uplink control information;
wherein the at least one processor is further configured to cause the apparatus to multiplex the following:
the first set of uplink control information and the at least part of the second set of uplink control information on the second physical uplink shared channel, if the importance of the first set of uplink control information is higher than the importance of the second set of uplink control information, and if there are enough resources on the second physical uplink shared channel for the at least part of the second set of uplink control information in addition to the first set of uplink control information;

the first set of uplink control information on the second physical uplink shared channel, if the importance of the first set of uplink control information is higher than the importance of the second set of uplink control information, and if there are not enough resources on the second physical uplink shared channel for the at least part of the second set of uplink control information in addition to the first set of uplink control information;

the second set of uplink control information and the at least part of the first set of uplink control information on the second physical uplink shared channel, if the importance of the second set of uplink control information is higher than the importance of the first set of uplink control information, and if there are enough resources on the second physical uplink shared channel for the at least part of the first set of uplink control information in addition to the second set of uplink control information; and the second set of uplink control information on the second physical uplink shared channel, if the importance of the second set of uplink control information is higher than the importance of the first set of uplink control information, and if there are not enough resources on the second physical uplink shared channel for the at least part of the first set of uplink control information in addition to the second set of uplink control information.

12. The apparatus according to claim 11, wherein the importance of the first set of uplink control information is based at least partly on a type and a priority of the first set of uplink control information, and wherein the importance of the second set of uplink control information is based at least partly on a type and a priority of the second set of uplink control information.

13. The apparatus according to claim 1, wherein the at least one processor is further configured to cause the apparatus to:

check if a pre-defined timer is expired or a pre-defined maximum number of attempts is reached before multiplexing the at least part of the first set of uplink control information on the second physical uplink shared channel.

14. The apparatus according to claim 1, wherein the first set of uplink control information comprises a hybrid automatic repeat request acknowledgement, a scheduling request, and channel state information.

15. The apparatus according to claim 1, wherein the apparatus is comprised in a terminal device.

16. An apparatus comprising at least one processor, and at least one memory including computer program code, wherein the at least one memory and the computer program code are configured, with the at least one processor, to cause the apparatus to:

transmit, to a terminal device, an indication to transmit a first set of uplink control information on a second physical uplink shared channel, wherein the first set of uplink control information is associated with a cancelled first physical uplink shared channel;

wherein the indication is carried in downlink control information scheduling the second physical uplink shared channel and comprises a one-bit field indicating whether the terminal device is to retransmit the first set of uplink control information on the second physical uplink shared channel;

wherein the downlink control information is transmitted on a physical downlink control channel addressed to the terminal device;

wherein the second physical uplink shared channel is scheduled by a retransmission uplink grant and comprises a transport block of the cancelled first physical uplink shared channel;

wherein the retransmission uplink grant corresponds to a hybrid automatic repeat request process identifier of the cancelled first physical uplink shared channel; and receive, from the terminal device, the second physical uplink shared channel comprising at least a part of the first set of uplink control information.

17. The apparatus according to claim 16, wherein the at least one processor is further configured to cause the apparatus to:

transmit, to the terminal device, a configuration comprising instructions to store the first set of uplink control information, if the first physical uplink shared channel is cancelled.

18. The apparatus according to claim 16, wherein the apparatus is comprised in a base station.

19. A method comprising:

cancelling a first physical uplink shared channel comprising a first set of uplink control information;

storing the first set of uplink control information;

receiving, from a base station, an indication to transmit the first set of stored uplink control information on the second physical uplink shared channel;

responsive to the indication, multiplexing at least a part of the first set of stored uplink control information on a second physical uplink shared channel;

transmitting, to the base station, the second physical uplink shared channel; and deleting the stored first set of uplink control information after the transmitting, wherein the cancelling occurs due to at least one of: an overlap with a higher-priority uplink channel, an overlap with downlink symbols, and an uplink cancellation indication for inter-user equipment prioritization;

wherein the indication is carried in downlink control information scheduling the second physical uplink shared channel and comprises a one-bit field indicating whether to retransmit the stored first set of uplink control information on a second physical uplink shared channel; and wherein the second physical uplink shared channel is scheduled by a retransmission uplink grant and comprises a transport block of the cancelled first physical uplink shared channel.

20. The method according to claim 19, further comprising:

receiving, from the base station, a configuration comprising instructions to store the first set of uplink control information, if the first physical uplink shared channel is cancelled; and applying the configuration.

* * * * *